United States Patent [19]

Wilson

[11] Patent Number: 4,770,076

[45] Date of Patent: Sep. 13, 1988

[54] WORK FED TRUSS CUTTERS

[75] Inventor: Christopher E. N. Wilson, West Yorkshire, England

[73] Assignee: Wilson Bros (Leeds) Limited, Yorkshire, England

[21] Appl. No.: 117,157

[22] Filed: Nov. 5, 1987

[30] Foreign Application Priority Data

Nov. 7, 1986 [GB] United Kingdom ............... 8626649

[51] Int. Cl.$^4$ .................................................. B27B 5/04
[52] U.S. Cl. ........................................ 83/71; 83/404.1;
83/422; 83/425.2; 83/432; 83/435.2; 83/581
[58] Field of Search ............... 83/71, 404.1, 422, 432,
83/435.2, 425.2, 581

[56] References Cited

U.S. PATENT DOCUMENTS

| | | | |
|---|---|---|---|
| 3,757,625 | 9/1973 | Pfenning et al. | 83/404.1 |
| 4,277,998 | 7/1981 | Mayo | 83/404.1 |
| 4,467,684 | 8/1984 | Thorsell | 83/404.1 |
| 4,545,274 | 10/1985 | Germond | 83/581 X |
| 4,676,129 | 6/1987 | Blanco | 83/71 |

Primary Examiner—Donald R. Schran
Attorney, Agent, or Firm—Fred Philpitt

[57] ABSTRACT

The present invention provides a work fed truss cutter in which the work piece is a length of timber and is fed through the machine in a direction at right angles to its length. A first pair of saws at the left hand side of the work piece cut the left hand end of the work piece while a second and right hand pair of saws cut the other end of the work piece to provide bevel cuts thereon. To simplify the machine construction, of each pair of saws each saw is mounted for the pivotal movement about an axis which is physically spaced from the saw disc and at least one saw of each pair is movable linearly towards and away from the work piece which cuts in distinction to the prior art wherein of each pair of saws, the saws are pivotable about a common axis which lies as accord in relation to each saw disc, which leads to a mechanically complicated mounting arrangement for the saws.

5 Claims, 4 Drawing Sheets

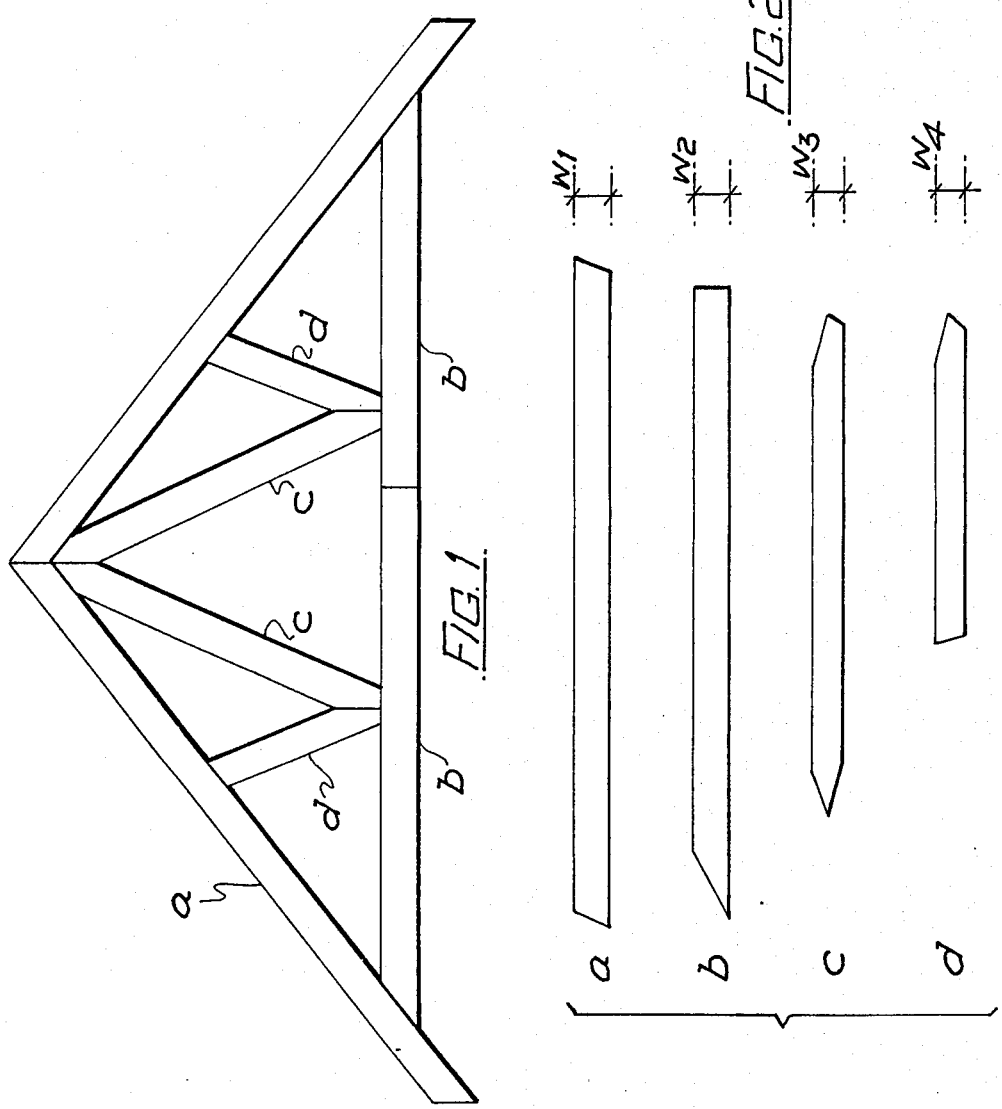

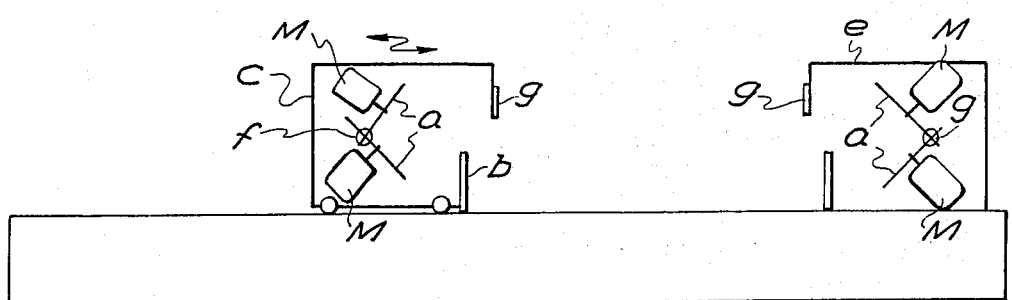
FIG. 3
PRIOR ART
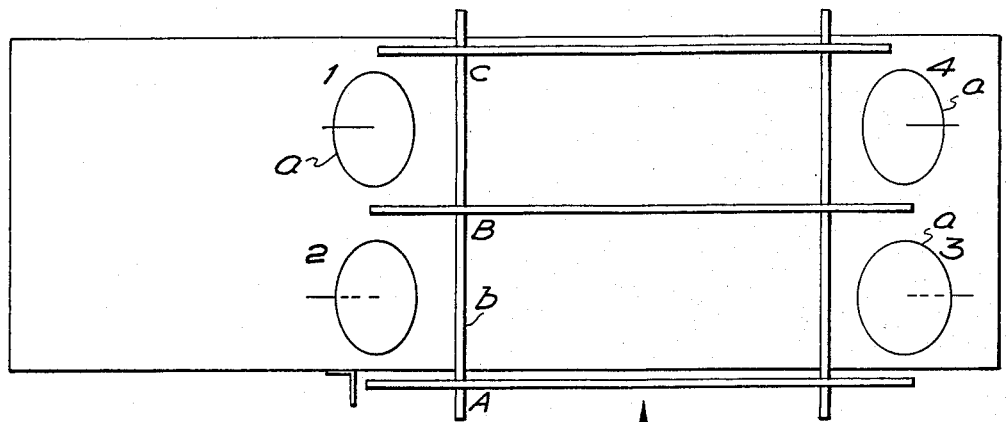
FIG. 4
PRIOR ART
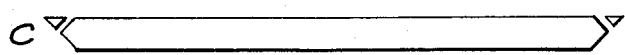
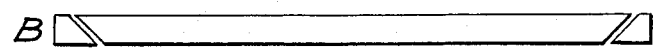
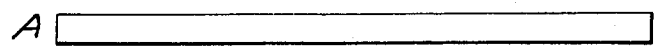
FIG. 5
PRIOR ART

WORK FED TRUSS CUTTERS

This invention relates to work fed truss cutters, being cutters for cutting lengths of timber to form the beams, bars rods of wooden roof trusses.

In a conventional work fed truss cutter, as opposed to a conventional cross cutter in which the work is held stationary whilst cutting takes place, the work which is in the form of a length of timber is passed through the cutter by heat means usually in the form of a conveyor in a direction which is at right angles to the length direction of the length of timber or work. Pairs of disc saws act on the ends of the work in order to make angular or bevelled cuts thereon as the work passes through the cutter. It will be appreciated therefore that the saw discs must be arranged to lie in planes which are parallel to the direction of feed of the work, and to remain in such planes when moved to adjusted positions.

There are two such discs at one side, the left hand side of the conveyor having regard to the infeed of the work, and two saw discs at the right hand side, forming a left hand pair and a right hand pair. Of each pair, when any particular cutting operation is being formed, it may be required that only one of the discs makes a single cut on the end of the timber work but it is frequently required that both saws cut the end of the work in planes which are oppositely inclined whereby at the end of the work the timber is bevelled to an apex or point. If it is assumed that the timber is bevelled to a point at each end, the length of the finished work will be the distance between the apexes at the end of the timber work.

It is important that the finished length of the timber work be accurate, and also that the bevel angles at each end of the work be accurate, and finally that the position of each apex of the timber work in relation to the sides of the work be accurately maintained.

In order that the finished length of the work will not vary when the saws are adjusted, each pair of saws is arranged so that it is pivotably adjustable about a common axis which in fact extends through the saw discs of each pair and forms a cord in relation to each disc. As the disc is pivotable about this cord, there is no increase or decrease of work resulting from the tilting of the saws to adjust the bevel angles on the finished work.

As these cutters are required to be set up each time a different work piece is to be cut, a considerable amount of time is spent in setting up the machine and of course the set up time increases depending upon the number or batch of similar work pieces which are to be machined. If the batch is relatively small, then the set-up time increases.

Attempts have been made to reduce the set-up time by automating the existing machinery by controlling same by means of computer devices into which required set-up peramiters can be fed, the saws then being adjusted automatically, but such attempts have resulted only in the provision of expensive equipment which arises because of the mechanical complexity of the traditional adjusting mechanisms for the cutter saws.

The present invention seeks to provide a work fed truss cutter of less complexity and of simplified mechanical construction which enhances the adaptation of the machine to computer control. In accordance with the present invention there is provided a work fed truss cutter comprising (a) feed means enabling the feed of a length of timber through the machine in a direction normal to the length;
(b) first and second left hand disc saws arranged with their saw discs in planes parallel to the direction of feed of the length of timber through the machine to enable the cutting of bevels on the left hand end of the length of timber;
(c) first and second right hand discs saws arranged with their saw discs in planes parallel to the direction of feed of the length of timber through the machine to enable the cutting of bevels on the right hand end of the length of timber;

characterised in that (i) each of said left hand and right hand discs saws is mounted for pivotal movement about its own axis which extends in said direction of feed but is physically spaced from the disc; and (ii) either said right or left hand saws are movable as an assembly towards and away from the other saw.

By making the saws pivotable about axes which are spaced from the saw discs, simplified pivotal mountings can be arranged, and as long as one pair of saws is movable towards and away from the other pairs, then the work piece can always be cut to the required length.

In order to provide for the location of the apexes of the work in relation to the sides, one saw of each pair of saws is preferably movable linearly relative to the other in a direction at right angles to the feed direction and towards and away from the other pair of saws.

Alternatively or additionally, the movement for providing that the apexes of the work can be located accurately in relation to the sides of the work, may be provided by making the feed conveyor movable in a direction at right angles to the feed and in a direction at right angles to the length direction of the timber as it passes through the cutter.

In known truss cutting machines, each time the machine is re-set for a different component, setting up of the saw blades forms a very considerable proportion of the time taken to cut a set of components for a batch of trusses, and this problem is accentuated if the batch run is small which is becoming increasingly common.

To overcome this problem attempts have been made to automate setting of the saw blades by powdered motions either manually operated or computer controlled. This has been expensive because of the mechanical complexity of the traditional machine and the number of axes to be controlled.

The present invention therefore seeks to obviate the disadvantage of known machines, by reducing the mechanical complexity of the machine, and at the same time reducing the number of axes to be controlled.

An embodiment of the invention will now be described by way of example, with reference to the accompanying drawings, wherein:

FIG. 1 shows a typical roof truss;

FIG. 2 shows the various timber components of the roof truss of FIG. 1;

FIG. 3 is a diagrammatic scale view of a known roof truss component cutter;

FIG. 4 is a plan view of the cutter of FIG. 3;

FIG. 5 illustrates the nature of the cuts performed by the saw blades of the cutter of FIGS. 3 and 4;

Figure 6:
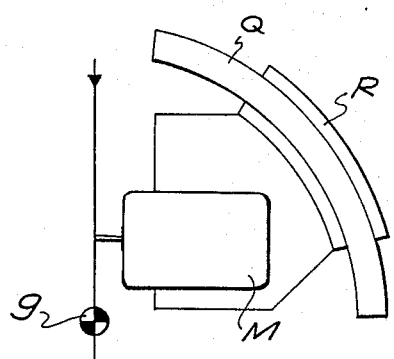
FIG. 6 shows a known mechanism for pivoting the saws of the cutter shown in FIGS. 3 and 4.
Figure 7:
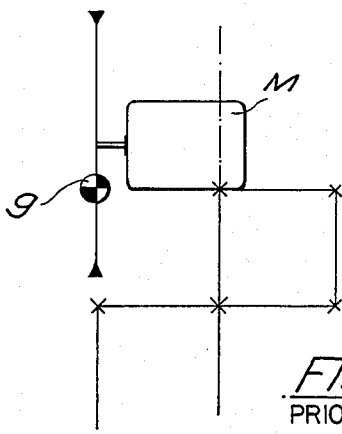
FIG. 7 shows an alternative known mechanism for pivoting the saws of the cutter shown in FIGS. 3 and 4.

Referring to the drawings, the typical roof truss shown in FIG. 1 comprises eight members, or bars or beams of which the ends have single or double cuts at either end as shown in FIG. 2. The width W of the timber may vary on the different members of a truss depending upon the design specification. In nearly all cases, the components of the truss are held one to another using nail plates which overlap adjacent ends of the members, the nail plates having tongs which penetrate the wood and which plates are usually driven in with an hydraulic press.

Referring now to FIG. 3, a conventional work feed truss cutter has four disc saws (a) arranged as right and left hand pairs, and the saws of each pair being located one behind the other in the direction of feed of the work through the cutter. In operation, the discs (a) are rotated as the timber to be cut is supported by and moved along the timber in feed conveyor (b). The overall length of the cut timber is obtained by adjusting the position of the movable head (c) containing the left hand saws along the bed (d) in relation to the fixed head (e) containing the right hand saws. The angles required at the ends of the truss components—see FIG. 2—are made by adjusting the angles of inclination of the saws (a). Each pair of saws is arranged to pivot on a common centre, and this is creates difficulty in mounting the saws (and their cutteers) due to the fact that the timber to be cut must pass through the machine without obstruction. One known mounting arrangement is shown in FIG. 6 which illustrates a quadrant slide Q and a mounting plate P which slides on guide Q and carries the saw motor M, and an alternative known arrangement a pantograph mechanism P, as shown in FIG. 8 is used for supplying the motor M.

With the above systems the apex of a double cut at the end of the work is fixed and to vary the distance of the centre line through the apex of the cut to the edge of the timber there is provided a vertical motion for each pair of saws or alternatively a shown in FIG. 3. In addition, because the width of the timber will vary, there is provided a vertical motion for the top pressers (g), FIG. 3. To achieve best results, the timber conveyors (b) and the top pressers (g) are capable of horizontal adjustment laterally of the cutter centre line CL, FIG. 3.

Figure 8:
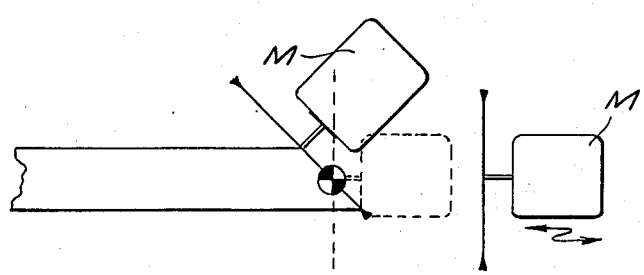
FIG. 8 shows how only one of the saws of a pair of saws of the machine shown in FIGS. 3 and 4 is used when it is required to make only one cut at the end of the work.
Figure 9A:
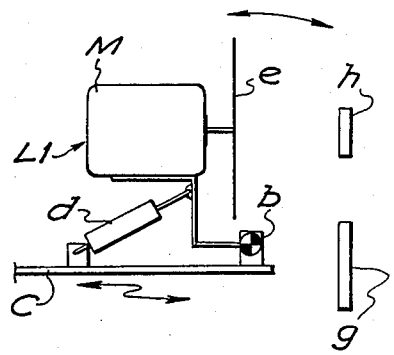
FIG. 9 is a view showing the mounting of the saws of a roof truss cutter embodying the invention.
Figure 9B:
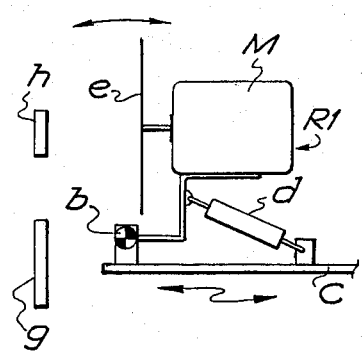
Figure 9C:
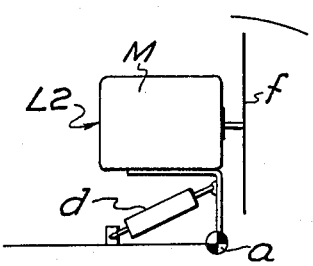
Figure 9D:
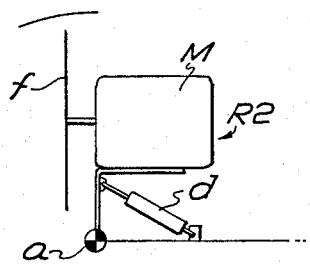

When only a single cut is required at an end of a work piece such as for example component (b) in FIG. 2—then at the appropriate side of the machine one of the saws is moved out of the way as shown in FIG. 8, and such saw must be capable of executing this.

Generally speaking therefore, and from a consideration of the above, it is necessary, on a conventional cutter, to provide for the following adjustments:

| Function | Number of Motions |
| --- | --- |
| Angular adjustment of four saws | 4 |
| Vertical motion for two pairs of saws or alternatively two timber conveyors | 2 |
| Vertical motion for two top pressers | 2 |
| Horizontal motion for two timber conveyors | 2 |
| Horizontal motion for two top pressers | 2 |
| Displacement of two saws for single cut ends | 2 |
| Length adjustment of one movable head | 1 |

Thus a total of 15 motions are required to provide for the differing types of components to be cut, and whilst it is not necessary, as has been previously stated, to bring into action every adjustment each time the machine is re-set for a different component, setting up time still takes a considerable proportion of the total time taken to cut a batch of components.

Figure 10:
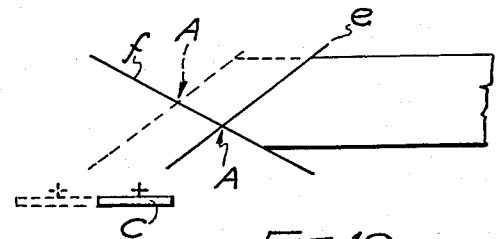
FIG. 10 shows a typical adjustment of one pair of saws.

FIG. 9 shows an embodiment of the invention. The cutter again has two pairs of saws, L1 and L2 being the left hand saws, and R1 and R2 being the right hand saws. The saws are shown in spaced relationship for clarity, but they will be arranged essentially as shown in FIG. 3. Instead of the saws (e) and (f) being arranged to pivot around respective common axes, one saw (f) of each pair of saws is arranged to pivot around a respective fixed centre (a), whilst the second saw (e) of each pair of saws is arranged to pivot around a respective centre (b), the centres (a) and (b) being offset relative to the saw discs and centres (b) being mounted on slides (c) which permit movement of the centres (b) in a horizontal plane relative to centres (a). The positioning of the slides and the angles of the saws can be achieved, for example, by jacks (d), and their positions determined by suitable sensing devices such as potentiometers or rotary shaft encoders. A typical adjustment of one pair of saws is shown in FIG. 10.

It will be seen that by altering the angles of the saws (e) and (f) as described above, any required combination of angles can be achieved, and that by moving the slides c the position of the apex A of two cuts can be easily adjusted.

Because of this latter feature, it is no longer necessary to adjust the height of the saws (e) and (f) or alternatively the timber conveyor (g), nor is it necessary to alter the horizontal position of the timber conveyor in relationship to the saws. It is however still necessary to provide for vertical and horizontal motion of the top pressers (h).

Thus the number of adjustments on the above-described arrangements are typically:

| Function | Number of Motions |
| --- | --- |
| Angular adjustment of four saws | 4 |
| Horizontal adjustment of two saws | 2 |
| Vertical adjustment of two top pressers | 2 |
| Horizontal adjustment of two top pressers | 2 |
| Length adjustment of one movable head | 1 |

Thus, a total of only 11 motions are required with the arrangement according to the embodiments of the invention as compared to the 15 motions necessary with a conventional machine. Furthermore, the mechanical design of the saw mountings is simplified. The provision of a mechanical design of greater simplicity leads to lower cost and greater rigidity. The problem of calculation of the relative position of each element of the machine to give the desired configuration of the truss member can easily be done by means of a computer, and it will only be necessary to input data of angles, timber length and width, and apex position.

A further feature is that by the use of a computer, suitably programmed, which when given the basic parameters of a truss, for example type, pitch angle, span, eaves overhang and material sections, one is able to computer the details of the individual members and set the machine automatically for each member by means of selection from a "menu" by the operator. Typically, this might reduce the number of inputs for a link truss from 38 to 6, and dramatically reduce the possibility of error.

From the above, it will be seen that a higher speed of setting is achieved due to the simultaneous setting of all the elements and due to reduced data input, there is reduced cost of construction of the machine due to simplicity made possible by use of a computer, there is greater accuracy due to mechanical simplicity and rigidity and more precise positioning of elements, and finally there is a reduction in the possibility of operator error due to reduced data input.

I claim:

1. A work fed truss cutter comprising
   (a) feed means enabling the feed of a length of timber through the machine in a direction normal to the length;
   (b) first and second left hand disc saws arranged with their saw discs in planes parallel to the direction of feed of the length of timber through the machine to enable the cutting of bevels on the left hand end of the length of timber;
   (c) first and second right hand disc saws arranged with their saw discs in planes parallel to the direction of feed of the length of timber through the machine to enable the cutting of bevels on the right hand end of the length of timber;
   characterised in that (i) each of said left hand and right hand disc saws is mounted for pivotal movement about its own axis which extends in said direction of feed but is physically spaced from the disc; and (ii) either said right or left hand saws are movable as an assembly towards and away from the other saw.

2. A work fed truss cutter according to claim 1, characterised in that the first or second right hand saw is movable linearly relative to the second or first right hand saw in a direction at right angles to the said direction of feed and towards and away from the left hand saws.

3. A work fed truss cutter according to claim 1, characterised in that the first or second left hand saw is movable linearly relative to the second or first left hand saw in a direction at right angles to the said direction of feed and towards and away from the right hand saws.

4. A work fed truss cutter according to claim 1 characterised in that feed means comprises a feed conveyor and the saws are movable relative to the conveyor in a direction at right angles to the direction of feed and in a direction at right angles to the length direction of the timber as it passes through the cutter.

5. A work fed truss cutter according to claim 3 in combination with a controlling computer and position detection means controlling automatically the positioning of each of the right and left hand saws as to their relative angular settings, and their relative linear settings, and the controlling the distance between the right hand aws and the left hand saws, depending upon the length of timber to be cut or the sequence of lengths of timber to be cut.

* * * * *